United States Patent
Shiung

(10) Patent No.: US 6,922,089 B2
(45) Date of Patent: Jul. 26, 2005

(54) DIGITAL FREQUENCY SYNTHESIZING CIRCUIT AND SYSTEM THEREOF USING INTERPOLATION AND LINEAR FEEDBACK SHIFT REGISTER (LFSR)

(75) Inventor: David Shiung, Tainan (TW)

(73) Assignee: Novatek Microelectronics Corp., Hsinchu (TW)

(*) Notice: Subject to any disclaimer, the term of this patent is extended or adjusted under 35 U.S.C. 154(b) by 0 days.

(21) Appl. No.: 10/655,898

(22) Filed: Sep. 4, 2003

(65) Prior Publication Data

US 2005/0035793 A1 Feb. 17, 2005

(30) Foreign Application Priority Data

Aug. 12, 2003 (TW) ..................... 92122055 U

(51) Int. Cl.[7] .............................................. H03B 21/00
(52) U.S. Cl. ...................................... 327/107; 327/106
(58) Field of Search ............................... 327/105–107, 327/129

(56) References Cited

U.S. PATENT DOCUMENTS

| 4,929,889 | A | * | 5/1990 | Seiler et al. ................. 714/731 |
| 5,404,402 | A | * | 4/1995 | Sprunk ....................... 713/189 |
| 6,577,678 | B2 | * | 6/2003 | Scheuermann .............. 375/222 |
| 6,715,105 | B1 | * | 3/2004 | Rearick ....................... 714/30 |

* cited by examiner

Primary Examiner—Timothy P. Callahan
Assistant Examiner—Cassandra Cox
(74) Attorney, Agent, or Firm—J.C. Patents

(57) ABSTRACT

The present invention provides an all-digital frequency synthesizer circuit using interpolation technique and Linear Feedback Shift Register (LFSR). This synthesizer adaptively outputs two sequences stored in a bank of memory, or shift register. Using the idea of interpolation, all synthesizable frequencies located between two predetermined threshold frequencies can be obtained, and resolution is determined by the order of LFSR thereby. A frequency synthesizing system is also included in the present invention.

8 Claims, 3 Drawing Sheets

US 6,922,089 B2

DIGITAL FREQUENCY SYNTHESIZING CIRCUIT AND SYSTEM THEREOF USING INTERPOLATION AND LINEAR FEEDBACK SHIFT REGISTER (LFSR)

CROSS-REFERENCE TO RELATED APPLICATION

This application claims the priority benefit of Taiwan application serial no. 92122055, filed Aug. 12, 2003.

BACKGROUND OF THE INVENTION

1. Field of the Invention

The present invention relates to an all-digital frequency synthesizer. More particularly, the present invention relates to an digital frequency synthesizer that consists only simple logics and a linear feedback shift register, which provides lower complexity and superior resolution of frequency.

2. Description of Related Art

Traditionally, either a direct frequency synthesizer, a phase-locked frequency synthesizer, or a digital synthesizer is used to synthesize frequencies. An example of a conventional direct frequency synthesizer is shown in the block diagram in FIG. 2. Providing a frequency 26.7457 kHz is to be synthesized herein, a direct frequency synthesizer utilizes successive approximation to get finer frequency, and thus desired frequency is approached. However, the hardware of this method is obviously complex.

For another example of prior frequency synthesizer, phase-locked technique is applied therein. Referring to FIG. 3, a bock diagram of a phase-locked frequency synthesizer is illustrated. This synthesizer incorporates a frequency divider with a Phase-Locked-Loop (PLL) circuit. The reference frequency, the synthesized frequency, and the minimal resolution in this case are $f_1$, $f_2$, and $\Delta f$ respectively. This architecture is usually implemented with analog circuitry and is also relatively disorderly as opposed to what is proposed in this present invention.

A digital synthesizer further realizes frequency synthesis function besides direct frequency synthesizer and phase-locked frequency synthesizer. The block diagram of a generic digital synthesizer is shown in FIG. 4. Notice that this architecture is similar to a Numerically Controlled Oscillator (NCO). The reference frequency $f_1$ and the incremental frequency $\Delta\theta$ are predetermined in this system. The synthesized frequency $f_2$ is thus generated via continuously looking up in a cosine-table. However, when a finer resolution is to be synthesized, say 201.3457 kHz, the cosine-table becomes large and this makes the hardware infeasible.

Concluding the three prior frequency synthesizers, complex scheme, analog circuitry, and low capability of target frequency are observed, which are undesirable unfortunately. Thus an all-digital frequency synthesizer complying feasible digital circuitry and finer resolution is proposed in this present invention.

SUMMARY OF THE INVENTION

As embodied and broadly described herein, the invention provides an all-digital circuit of frequency synthesizer using interpolation technique and Linear Feedback Shift Register (LFSR). The basic concept of this synthesizer is to store two sequences in a bank of memory or shift register. Using the idea of interpolation, all synthesizable frequencies located between two predetermined threshold frequencies can be obtained, and resolution is determined by the order of LFSR thereby. A all-digital frequency synthesizing system is also included.

The basic architecture of frequency synthesizer in this present invention is shown in FIG. 1. The block 130 'Seq.+' and block 132 'Seq.−' are memory devices that store samples of the two reference frequencies $\sin(2\pi \hat{f}_1 t)$ and $\sin(2\pi \hat{f}_1 t)$. Theoretically all the frequencies lie between $\hat{f}_1$ and $\hat{f}_2$ can be synthesized using this architecture. The minimal resolution in frequency is $$\frac{|\hat{f}_1 - \hat{f}_2|}{2^N},$$

where N is the order of the LFSR 140. The output of multiplexor (MUX) 110 is determined by the value in the LFSR 140. When the value in the LFSR 140 is less than a threshold value, the data in 'Seq.−' 130 is passed; otherwise, the data in 'Seq.+' 132 passed, clocked by the rate 'Digi_clk'. When one sequence is completed, the value in LFSR 140 is shifted by one position and then is compared with the predetermined threshold again. With the method described herein, an all-digital, less complexity and superior resolution frequency synthesizer is embodied.

These and other objects, features and advantages of the present invention will become apparent from the following detailed description of illustrative embodiments thereof, which is to be read in connection with the accompanying drawings.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
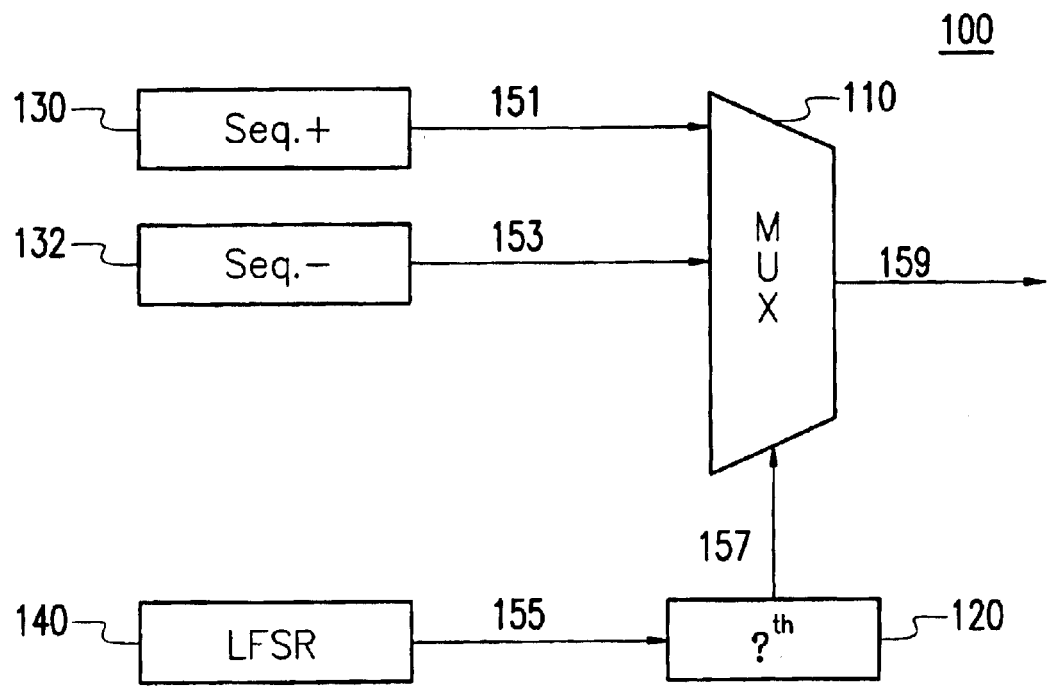
FIG. 1 is a block diagram 100 illustrating a frequency synthesizer according to one preferred embodiment in this present invention.
Figure 2:
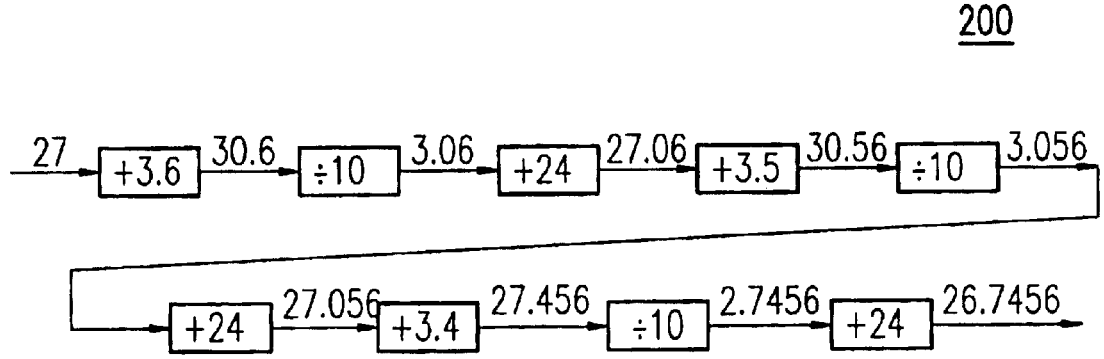
FIG. 2 is a block diagram 200 illustrating a direct frequency synthesizer for one prior art example.
Figure 3:
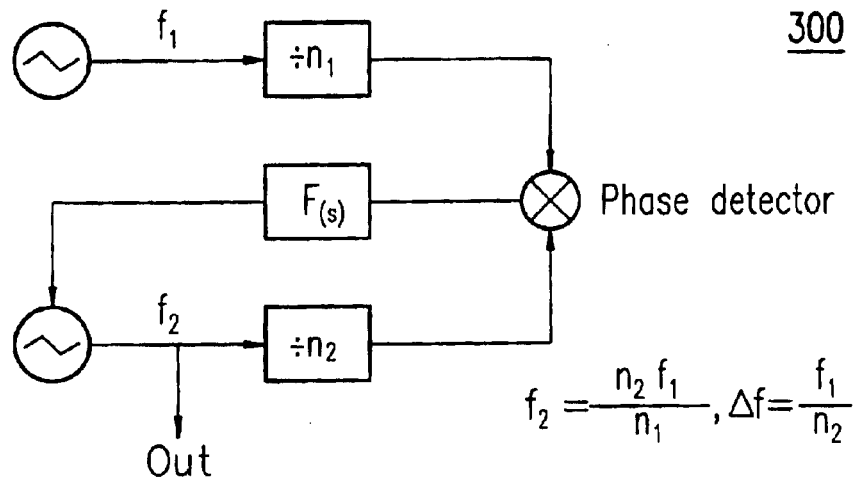
FIG. 3 is a block diagram 300 illustrating a frequency synthesizer using PLL for another prior art example.
Figure 4:
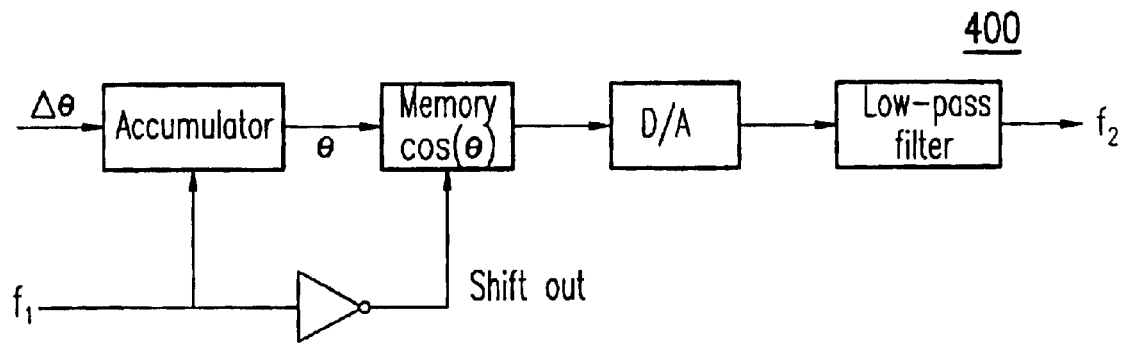
FIG. 4 is a block diagram 400 illustrating a generic digital frequency synthesizer for yet another prior art example.
Figure 5:
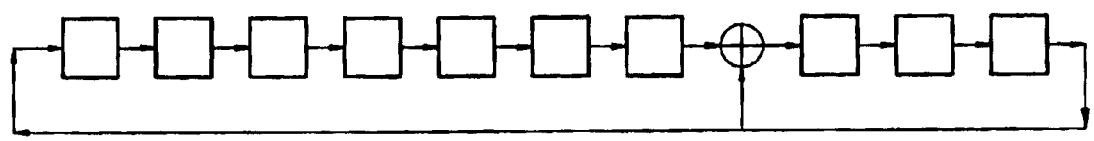
FIG. 5 is a block diagram 500 illustrating a LFSR using Galois configuration according to one preferred embodiment in this present invention.

The present invention provides a simpler frequency synthesizer capable of synthesizing a high-precision signal as shown in FIG. 1. Assuming an output sequence with bitwidth 2 is to be generated, and the system clock is 13.392 MHz, the reference frequencies are thus 13392/66=202.909 kHz and 13392/67=199.881 kHz. Also assuming the target output signal is designated 201 kHz herein. Thus the values in 'Seq.−' 130 and 'Seq.+' 132 in FIG. 1 are represented as "00000000000000001111111111111111000000000 0000000−1−1−1−1−1−1−1−1−1−1−1−1−1−1−1−1" and "000000000000000001111111111111111100000000 00000000−1−1−1−1−1−1−1−1−1−1−1−1−1−1−1−1" respectively. For notation simplicity, these two sequences are also represented as "16/17/16/17" and "17/17/16/17" respectively. Since 11392/201=66.6269, the probability to generate output "Seq.−" is 0.6269. Similarly, the probability to generate "Seq.+" is 0.3731 (i.e. 1−0.6269). If we assign the order of the LFSR 140 to be 10 and the generating polynomial to be $g(D)=1+D^3+D^{10}$, the LFSR 140 may be plotted as the diagram in FIG. 5 accordingly. Notice that a Galois configuration is presented this LFSR 140, while a Fibonacci configuration is also feasible for a LFSR. Since the order of the LFSR is set to 10, the minimal frequency resolution is thus $(202.909-199.881)/2^{10}=0.002957$ kHz. The threshold in this design is thus set to round $(0.3731*1024)/1024=0.3730_{(10)}=0101111110_{(2)}$.

Figure 6A:
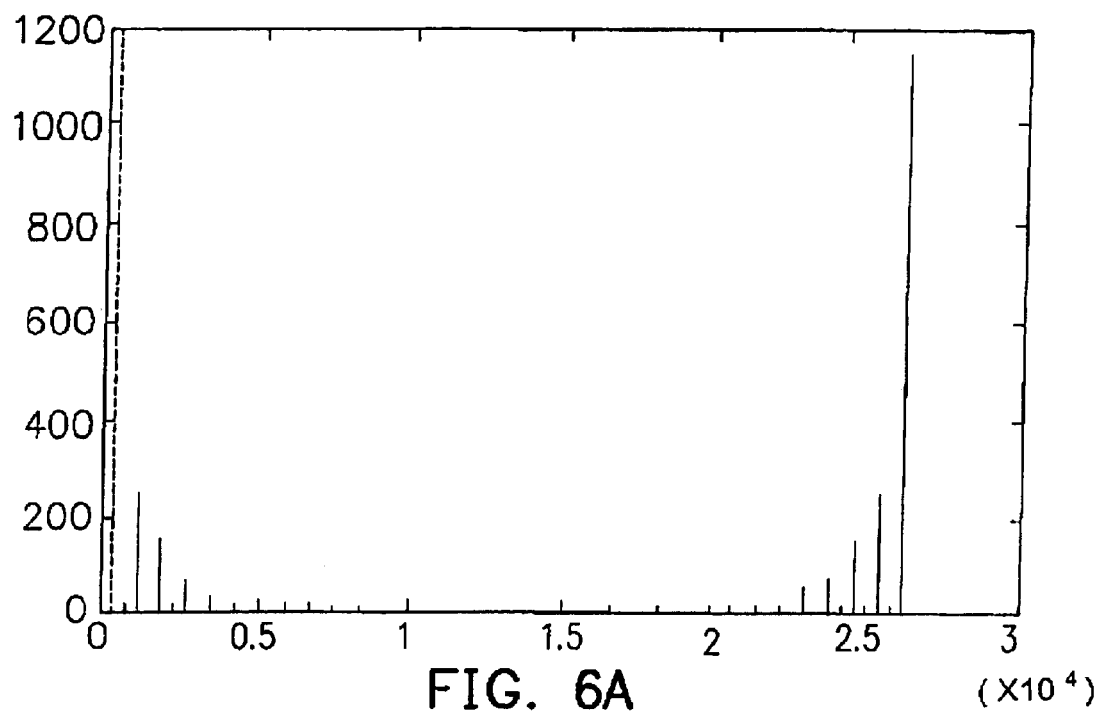
FIG. 6A is a diagram showing Discrete Fourier Transform (DFT) of the output signal of the frequency synthesizer in time domain according to one preferred embodiment in this present invention.
Figure 6B:
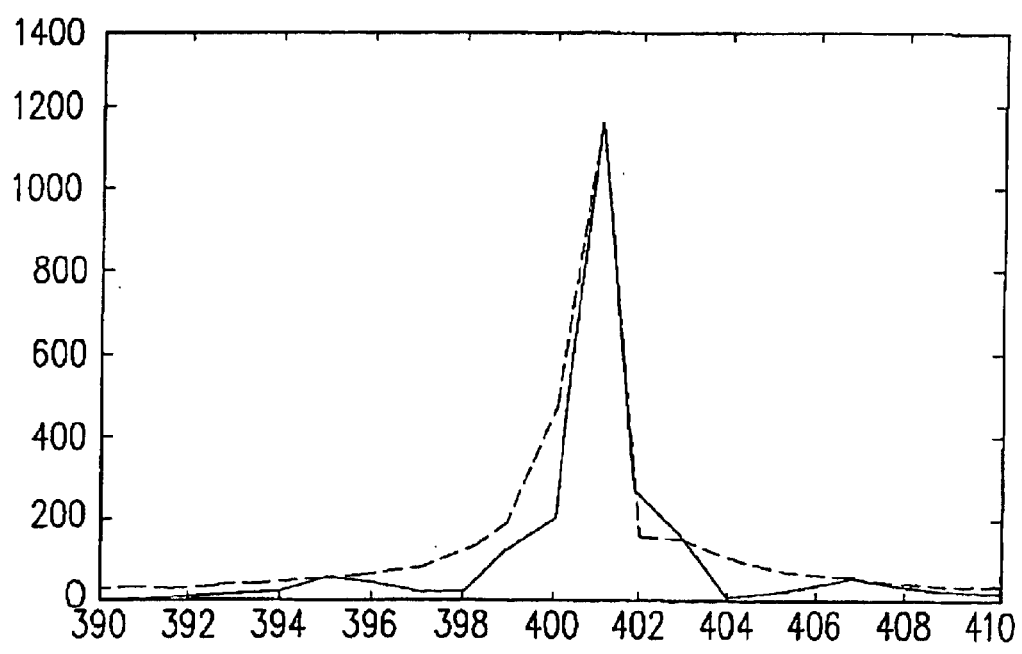
FIG. 6B is a diagram showing Discrete Fourier Transform (DFT) of the output signal of the frequency synthesizer in frequency domain according to one preferred embodiment in this present invention.

In order to examine the accuracy of the synthesized frequency, a Discrete Fourier Transform (DPT) of the output signal is provided in FIG. 6A and FIG 6B. FIG. 6A is a diagram showing Discrete Fourier Transform (DFT) of the output signal of the frequency synthesizer according to one preferred embodiment in this present invention. FIG. 6B is a zoom-in version of FIG 6A around index 400. The x-labels of both FIG. 6A and FIG. 6B denote "a scaled version of the frequency." The y-labels of both FIG 6A and FIG 6B denote the amplitude response of the synthesized signal. Notice that if performing zoom-in around 201 kHz on the x-axis and compare the synthesized spectrum with that of sin (2π·201k·t), an exact match is observed.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A frequency synthesizing circuit, the circuit being digital, comprising:

a multiplexor having at least a first input, a second input, an output, and a control terminal;

a controller having at least an input and an output, wherein the output coupling to the control terminal of the multiplexor provides at least one-bit signal to select either data feeding the first input or data feeding the second input of the multiplexor to pass the multiplexor;

a first memory device coupling to the first input of the multiplexor for storing a first reference frequency sampled from sinusoidal waves;

a second memory device coupling to the second input of the multiplexor for storing a second reference frequency sampled from sinusoidal waves;

a linear feedback shift register coupling to the input of the controller, wherein the linear feedback shift register stores a target frequency so as to compare with a predetermined threshold in sequence; and a digital clock signal for clocking a sequential operation of the frequency synthesizing circuit.

2. The sequential operation of frequency synthesizing circuit, the frequency synthesizing circuit being digital and comprising:

a multiplexor having at least a first input, a second input, an output, and a control terminal;

a controller having at least an input and an output wherein the output coupling to the control terminal of the multiplexor provides at least one-bit signal to select either data feeding the first input or data feeding the second input of the multiplexor to pass the multiplexor;

a first memory device coupling to the first input of the multiplexor for storing a first reference frequency;

a second memory device coupling to the second input of the multiplexor for storing a second reference frequency;

a linear feedback shift register coupling to the input of the controller, wherein the linear feedback shift register stores a target frequency so as to compare with a predetermined threshold in sequence; and a digital clock signal for clocking a sequential operation of the frequency synthesizing circuit;

wherein the target frequency is compared with the predetermined threshold for determining either data feeding the first input of the multiplexor or data feeding the second input of the multiplexor to pass to the output of the multiplexor depending on the target frequency being larger or smaller than the predetermined threshold, and the target frequency is shifted by one position for next comparison until a minimal resolution does not distinguish a difference between the target frequency and the predetermined threshold.

3. The minimal resolution of the frequency synthesizing circuit as recited in claim 2, wherein the minimal resolution is determined by a ratio of a difference between the first reference frequency and the second reference frequency to a two's power, the power is the order of the linear feedback shift register.

4. A frequency synthesizing system, comprising:

a multiplexor having at least a first input, a second input in parallel, an output, and a control terminal;

a controller having at least an input and an output, wherein the output coupling to the control terminal of the multiplexor provides at least one-bit signal to select either data feeding the first input or data feeding the second input of the multiplexor to pass;

a first memory device coupling to the first input of the multiplexor for storing transformation of a first reference frequency, wherein the transformation is sinusoidal function;

a second memory device coupling to the second input of the multiplexor for storing transformation of a second reference frequency, wherein the transformation is sinusoidal function;

a linear feedback shift register coupling to the input of the controller, wherein the linear feedback shift register stores a target frequency so as to compare with a predetermined threshold in sequence; and a digital clock signal for clocking a sequential operation of the frequency synthesizing system.

5. The sequential operation of a frequency synthesizing system, the frequency synthesizing system comprising:

a multiplexor having at least a first input, a second input in parallel, an output, and a control terminal;

a controller having at least an input and an output, wherein the output coupling to the control terminal of the multiplexor provides at least one-hit signal to select either data feeding the first input or data feeding the second input of the multiplexor to pass;

a first memory device coupling to the first input of the multiplexor for storing transformation of a first reference frequency;

a second memory device coupling to the second input of the multiplexor for storing transformation of a second reference frequency;

a linear feedback shift register coupling to the input of the controller, wherein the linear feedback shift register stores a target frequency so as to compare with a predetermined threshold in sequence; and a digital clock signal for clocking a sequential operation of the frequency synthesizing system;

wherein the target frequency compared with the predetermined threshold for determining either data feeding the first input of the multiplexor or the second input of the multiplexor to pass to the output of the multiplexor depending on the target frequency being larger or smaller than the predetermined threshold, and the target frequency is shifted by one position for next comparison until a minimal resolution does not distinguish a difference between the target frequency and the predetermined threshold.

6. The minimal resolution of the frequency synthesizing system as recited in claim 5, wherein the minimal resolution is determined by a ratio of a difference between the first reference frequency and the second reference frequency to two to the power of the order of the linear feedback shift register.

7. A frequency synthesizing circuit, the circuit being digital, comprising:

a multiplexor having at least a first input, a second input, an output, and a control terminal;

a controller having at least an input and an output, wherein the output coupling to the control terminal of the multiplexor provides at least one-bit signal to select either data feeding the first input or data feeding the second input of the multiplexor to pass the multiplexor;

a first memory device coupling to the first input of the multiplexor for storing a first reference frequency;

a second memory device coupling to the second input of the multiplexor for storing a second reference frequency;

a linear feedback shift register coupling to the input of the controller, wherein the linear feedback shift register stores a target frequency so as to compare with a predetermined threshold in sequence, and an order of the linear feedback shift register determines the minimal resolution; and a digital clock signal for clocking a sequential operation of the frequency synthesizing circuit.

8. A frequency synthesizing system, comprising:

a multiplexor having at least a first input, a second input in parallel, an output, and a control terminal;

a controller having at least an input and an output, wherein the output coupling to the control terminal of the multiplexor provides at least one-bit signal to select either data feeding the first input or data feeding the second input of the multiplexor to pass;

a first memory device coupling to the first input of the multiplexor for storing transformation of a first reference frequency;

a second memory device coupling to the second input of the multiplexor for storing transformation of a second reference frequency;

a linear feedback shift register coupling to the input of the controller, wherein the linear feedback shift register stores a target frequency so as to compare with a predetermined threshold in sequence, and an order of the linear feedback shift register determines an order of the minimal resolution; and a digital clock signal for clocking a sequential operation of the frequency synthesizing system.

* * * * *